United States Patent [19]

Anderton et al.

[11] Patent Number: 5,201,171
[45] Date of Patent: Apr. 13, 1993

[54] METHOD AND APPARATUS FOR RETAINING A TRACK CHAIN JOINT

[75] Inventors: Peter W. Anderton, Peoria; Morris E. Taft, Metamora, both of Ill.; Michel P. Peeters, Bernin; Jean-Francois P. C. Villard, Tullins, both of France

[73] Assignee: Caterpillar Inc., Peoria, Ill.

[21] Appl. No.: 798,444

[22] Filed: Nov. 26, 1991

[51] Int. Cl.⁵ .................. B21L 17/00; F16G 13/06
[52] U.S. Cl. .......................................... 59/901; 59/7; 29/517; 474/223; 305/58 R
[58] Field of Search .................. 305/11, 14, 39, 58 R, 305/58 PC; 59/7, 11, 901; 474/223; 29/515, 516, 517

[56] References Cited

U.S. PATENT DOCUMENTS

| | | |
|---|---|---|
| 1,507,757 | 9/1924 | Savage . |
| 3,027,201 | 3/1962 | Blazek et al. .................. 305/58 R |
| 3,179,475 | 4/1965 | Lambie ............................ 305/58 R |
| 3,492,054 | 1/1970 | Boggs et al. ......................... 305/11 |
| 3,831,257 | 8/1974 | Boggs et al. ......................... 29/401 |
| 3,958,836 | 5/1976 | Brown et al. ....................... 305/14 |
| 4,182,578 | 1/1980 | Livesay et al. ..................... 403/317 |
| 4,191,431 | 3/1980 | Roley et al. .................... 305/58 R |
| 4,288,172 | 9/1981 | Livesay et al. ..................... 403/317 |
| 4,618,190 | 10/1986 | Garman et al. ..................... 305/39 |
| 4,639,995 | 2/1987 | Garman et al. .................. 29/402.08 |
| 4,995,678 | 2/1991 | Jinkens ............................ 305/58 R |
| 5,069,509 | 12/1991 | Johnson et al. ..................... 305/11 |
| 5,072,655 | 12/1991 | Adler ................................. 29/517 |

Primary Examiner—David Jones
Attorney, Agent, or Firm—O. Gordon Pence

[57] ABSTRACT

A method and apparatus of assembling a joint of an endless track chain for track-type vehicles to prevent end play in the joint is disclosed. The joint includes a pair of links and a cylindrical pin. Each link includes a laterally outwardly offset outboard end collar having a boss extending outwardly therefrom and a bore therethrough. Each boss has an outer periphery and the pin includes opposite end portions. Each end portion is pressed and non-rotatably mounted into a respective one of the bores of the outboard end collars. The method comprises the steps of forming a generally arcuately shaped annular groove about each of the end portions of the pin, placing a punch device against the outer periphery of the boss in radial alignment with the groove in the end portion of the pin, and applying a sufficient force on the punch device to form at least one mechanically formed nodule protruding from the second bore of each outboard end collar into a respective one of the grooves. The nodule has a cross-sectional configuration substantially conforming to the groove.

8 Claims, 3 Drawing Sheets

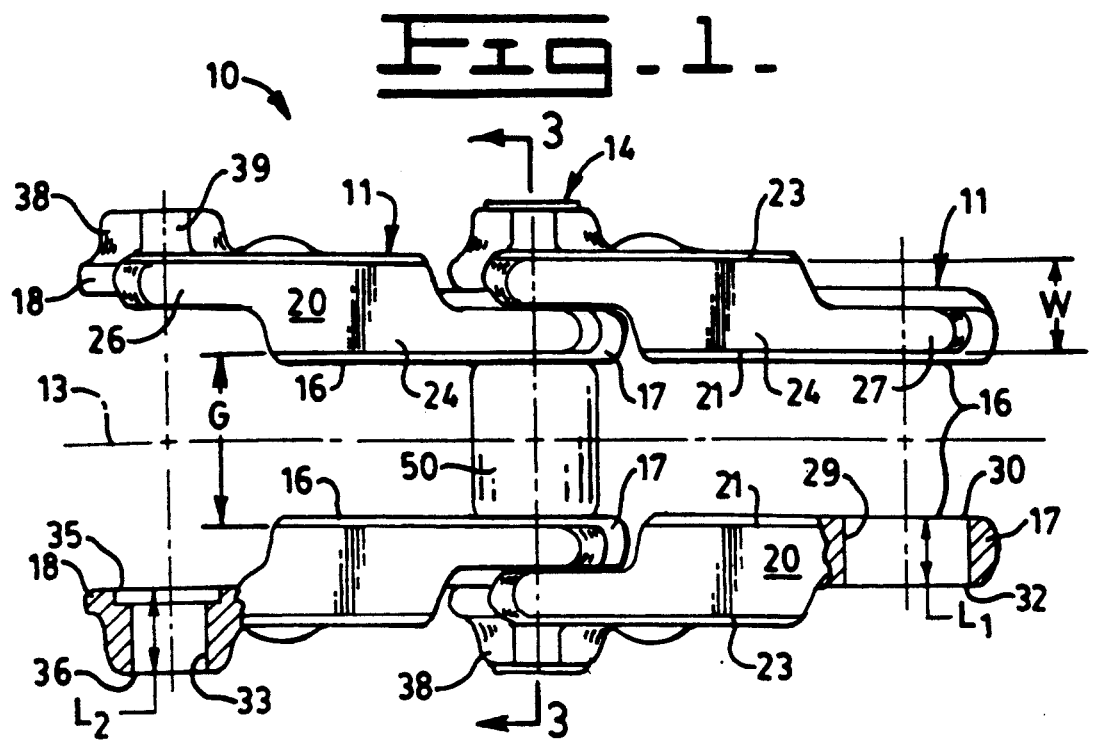
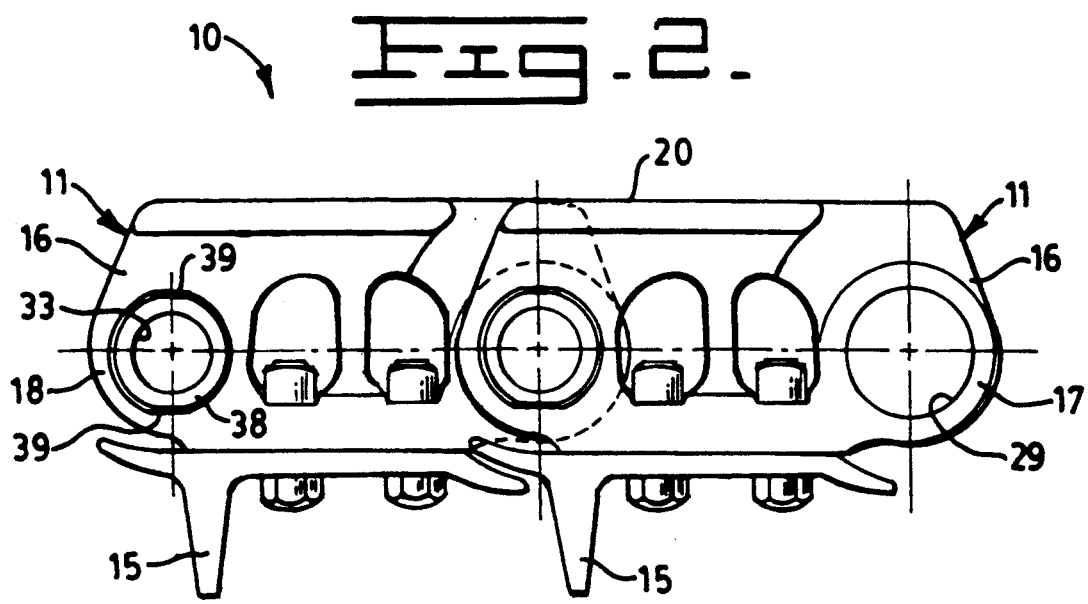

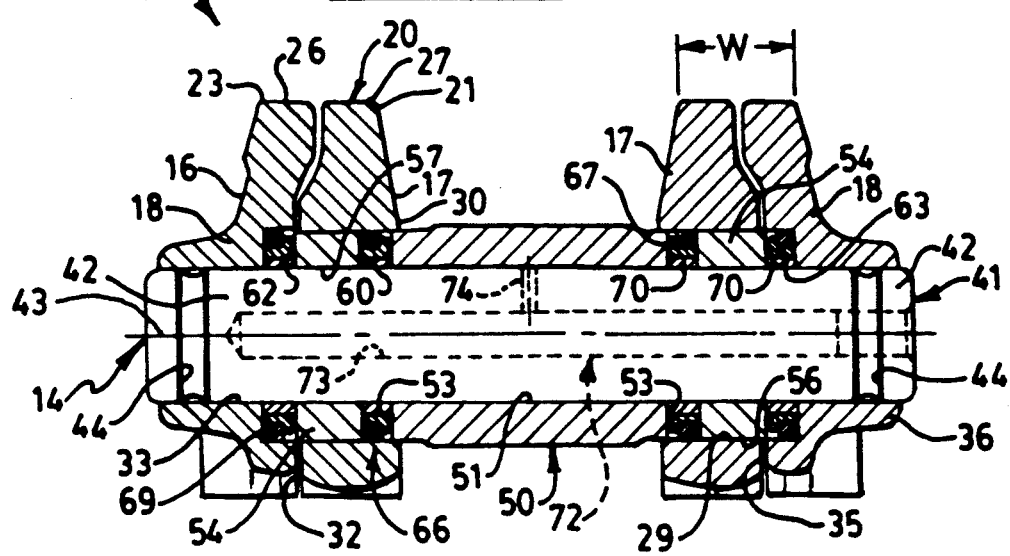
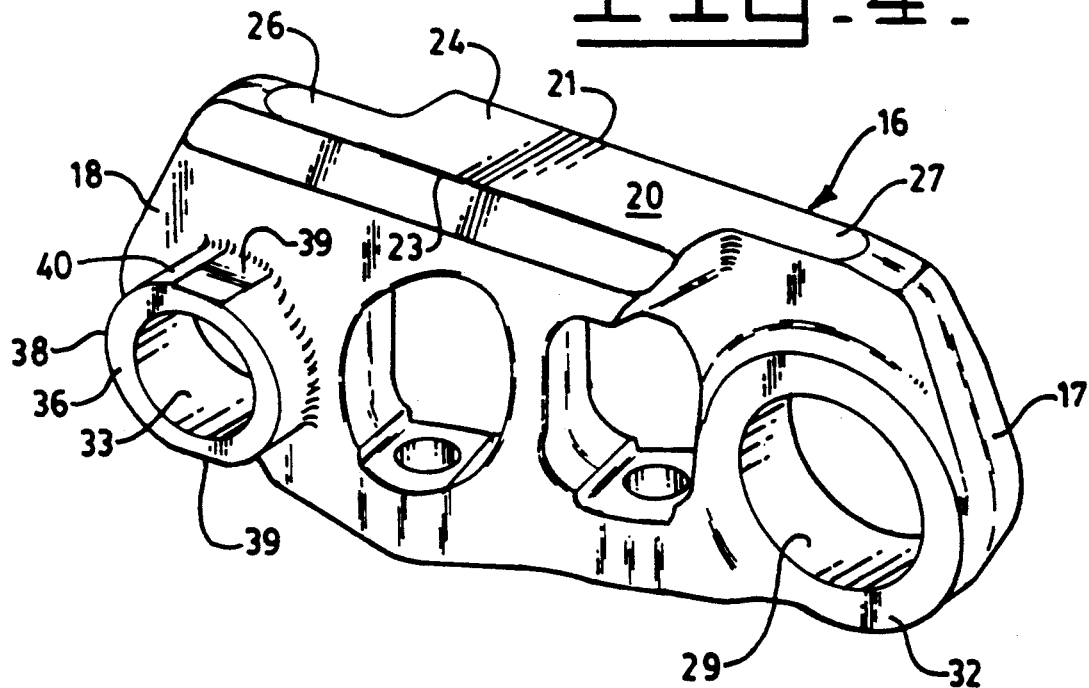

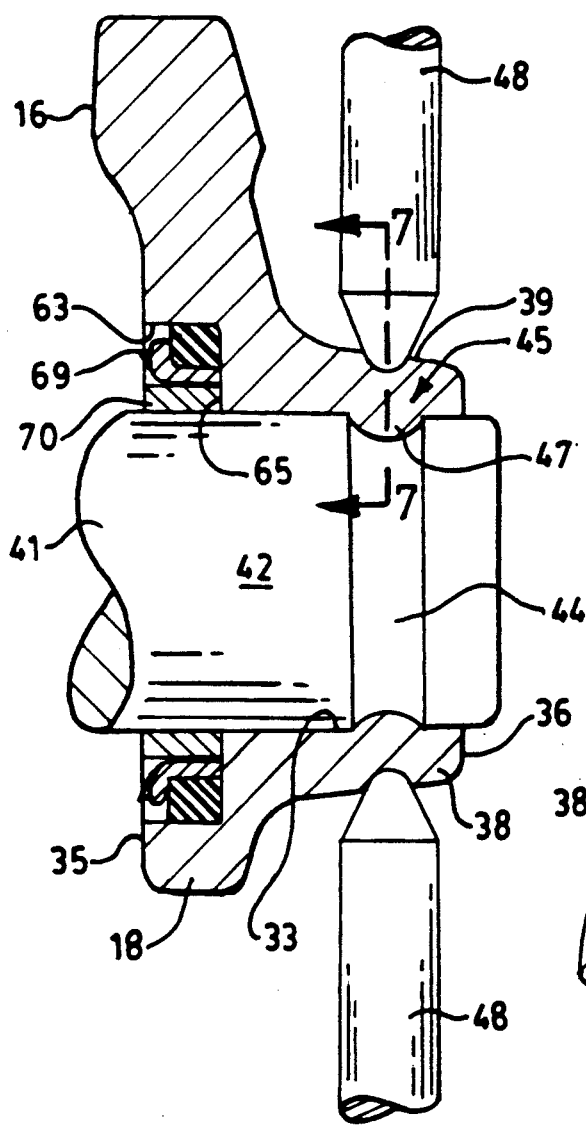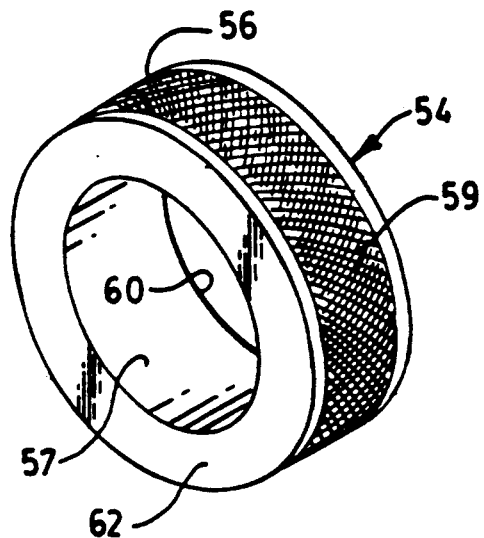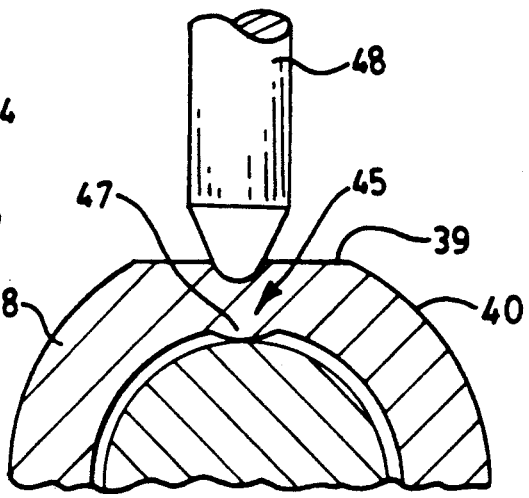

METHOD AND APPARATUS FOR RETAINING A TRACK CHAIN JOINT

DESCRIPTION

1. Technical Field

This invention relates generally to track chain with rotatable bushings for use on earthmoving vehicles used for mining, construction and the like and, more particularly, to a method and apparatus for retaining the joints of such track chain.

2. Background Art

A track joint is customarily held together by an interference fit between the ends of the track pins and their respective link bores into which the pin ends are tightly received. Even though a very high press force, typically exceeding 60 tons (54.4 metric tons) is used to press the links onto their respective pin ends, the links still have a tendency to move outwardly on the pin as a result of working forces exerted on the track during operation of the vehicle. This outward movement causes the joints to become loose or develop what is commonly referred to as end play.

Various methods have been tried to limit the amount of end play in track joints. Keeper assemblies, such as those disclosed in U.S. Pat. No. 4,182,578 issued on Jan. 8, 1980 and U.S. Pat. No. 4,288,172 issued on Sep. 8, 1981, both to Richard E. Livesay et al. and both assigned to the assignee hereof, have been successfully employed to reduce such end play movement. In order to accommodate manufacturing tolerances, joints utilizing such keepers must have a certain amount of clearance which produces a limited amount of built-in end play. As a result, these keepers reduce, but do not completely eliminate end play.

Another method of limiting end play is disclosed in U.S. Pat. No. 3,831,257 issued on Aug. 27, 1974 to Roger L. Boggs et al., which patent is also assigned to the assignee hereof, wherein welding about the ends of the track pins is employed. In this method, retention is quite dependent on the strength of the weld. In practice, weld strength is difficult to control with any degree of consistency. If a weld is so weak that it breaks, all of its retention ability is lost.

In U.S. Pat. No. 1,507,757 issued to Edwin H. Savage on Sep. 9, 1924, a soft metal key is driven through an opening in a rail and shoe of a track unit and into an angled pin groove to provide a locking device for securing the pin with the track unit.

More recently, the apparatus and method of retaining a track joint disclosed in related U.S. Pat. Nos. 4,618,190 and 4,639,995, issued respectively on Oct. 21, 1986 and Feb. 3, 1987, to James A. Garman et al. and also assigned to the assignee hereof, have been successfully utilized. In such apparatus and method, appropriate grooves must be machined in both the pins and the links.

All of the above references have been employed with track chain with a fixed or nonrotatable bushing. It has recognized for sometime that external bushing life could be extended by making the bushing rotatable. One such rotating bushing design is disclosed in U.S. Pat. No. 3,492,054 for Track Hinge Joints With Rotating Bushings that issued Jan. 27, 1970 to R. L. Boggs et al. and assigned to the assignee hereof. Such rotating bushing design was not commercialized, however, because of other problems it introduced. One such problem was the loss of structural rigidity in the track chain. Such loss is due to the fact that the bushing is no longer secured to the links. The ensuing flexure aggravates the end play problem in rotatable bushing track.

The solution to the above problems is hampered by a third problem, which is inability to change certain dimensions of the track. One such dimension is the rail-to-rail width or gauge of the track. Like railroad track, the track links provide a pair of rail surfaces on which the wheels or rollers of the vehicle ride. The rail width or gauge for any particular vehicle is, for all practical purposes, permanently set and cannot be changed. This is because any change in rail gauge would require corresponding changes in the remaining components of the vehicle undercarriage and because the changed track would not be interchangeable with the track on existing vehicles.

The present invention is directed to overcoming the shortcomings of the prior attempts at providing a rotatably bushing track joint with restricted end play.

DISCLOSURE OF THE INVENTION

In accordance with one aspect of the present invention, there is provided a method and apparatus of assembling a joint of an endless track chain for track-type vehicles to prevent end play in the joint. The joint includes a pair of links and a cylindrical pin. Each link includes a laterally outwardly offset outboard end collar having a boss extending outwardly therefrom and a bore therethrough. Each boss has an outer periphery and the pin includes opposite end portions. Each end portion is pressed and non-rotatably mounted into a respective one of the bores of the outboard end collars. The method comprises the steps of forming a generally arcuately shaped annular groove about each of the end portions of the pin, placing a punch device against the outer periphery of the boss in radial alignment with the groove in the end portion of the pin, and applying a sufficient force on the punch device to form at least one mechanically formed nodule protruding from the second bore of each outboard end collar into a respective one of the grooves. The nodule has a cross-sectional configuration substantially conforming to the groove.

In accordance with another aspect of the present invention, apparatus for retaining the track joints of an endless track chain for track-type vehicles is provided to prevent endplay in such joints. Each joint includes a pair of links and a cylindrical pin. Each link has an outboard end collar with a pin boss extending a substantial distance outwardly therefrom and a bore therethrough. Each pin has opposite end portions, each end portion being pressed and non-rotatably mounted into a respective one of the bores of the outboard end collars. The apparatus comprises a generally arcuately shaped annular groove formed in each of the opposite end portions of the pin. Each groove is disposed within the bore at a location along the pin boss. At least one mechanically formed nodule protrudes inwardly from each of the bores into respective ones of the pin grooves. Each nodule has a cross-sectional configuration substantially conforming to its groove and is formed from material that has been permanently extruded from its pin boss into the groove.

BRIEF DESCRIPTION OF THE DRAWINGS

FIG. 1 is a plan view of a portion of an endless track chain embodying the principles of the present invention;

FIG. 2 is a side elevational view of the track chain shown in FIG. 1, but with track shoes added thereto;

FIG. 3 is a transverse cross-sectional view taken along lines 3—3 of FIG. 2 through a hinge joint thereof, but with the track shoes removed;

FIG. 4 is a full perspective view of one of the track links of the track chain shown in FIG. 1;

FIG. 5 is an enlarged perspective of one of the sleeve bearings shown in the joint of FIG. 3;

FIG. 6 is a fragmentary cross-sectional view of one of the joints shown in FIG. 3 and illustrating preferred means for mechanically interlocking the pin to the link; and FIG. 7 is a fragmentary cross-sectional view taken along lines 7—7 of FIG. 6 further illustrating the preferred interlocking means.

BEST MODE FOR CARRYING OUT THE INVENTION

Referring more particularly to the drawings, an endless track chain embodying the principles of the present invention is generally indicated at 10 in FIGS. 1 and 2 for use on a track-type vehicle (not shown). Track chain 10 is constructed from a plurality of link sets 11 which are articulately coupled in a transverse relation along a longitudinal centerline 13 of the chain 10 by a like plurality of hinge joints 14. A like plurality of track shoes (15) (FIG. 2) are bolted to the link sets 11. Each link set 11 includes a pair of laterally spaced, longitudinally extending links, one being a right-hand link and the other being a left-hand link. As such links are mirror images of each other, both are referred to herein by reference numeral 16. Each link 16 is provided with an inboard end collar 17 and an opposite outboard end collar 18. The inboard end collar 17 is laterally offset inwardly toward the centerline 13 of the chain 10, while the outboard end collar 18 is laterally offset outwardly therefrom. Link 16 further includes a longitudinally disposed rail surface 20. As best shown in FIGS. 1 and 4, such rail surface 20 has a predetermined overall width "W" between an inner edge 21 and an outer edge 23. Such rail surface 20 includes a full width central portion 24, a generally one-half width outboard portion 26 which extends along the outer edge 23 over the outboard end collar 18 and a generally one-half width inboard portion 27 which extends along the inner edge 23 over the inboard end portion 17. The distance between the inner edge 21 of one link in the link set 11 to the inner edge 21 of the other link defines a rail gauge width "G".

The inboard end collar 17 has a first bore 29 therethrough which extends from an inner surface 30 (FIG. 1) of the inboard end collar to an outer surface 32 thereof. The inner surface 30 is offset inwardly from the inner edge 21 of the rail surface 20. The outer surface 32 is offset outwardly relative to the inboard portion 27 of the rail surface 20 so as to be disposed in a position substantially closer to the outer edge 23 of the rail surface 20 than to the inner edge 21 thereof. This offset positioning of the inner and outer surfaces 30,32, respectively, provide the first bore 29 with a predetermined bore length "L$_1$" (FIG. 1) that is greater than one-half the width of the rail surface 20. Preferably, the outer surface 32 is positioned within a range of from substantially greater than 0.50 times to less than 1.0 times the rail width "W" from the inner rail edge 21.

The outer end collar 18 has a second bore 33 therethrough which extends from an inner surface 35 to an outer surface 36 of the end collar 18. As best shown in FIG. 3, each second bore 33 has a counterbore 63 adjacent the inner surface 35. Each counterbore 63 has a radial shoulder 65 at the bottom thereof that is disposed outwardly form the inner surface 35. The inner surface 35 is likewise offset outwardly from the inboard portion 27 of the rail surface 20 so as to lie outboard of the offset outer surface 32 of the inboard end collar 17 of an adjoining link in the track chain 10. It should be appreciated that the offsetting relationship of the end collars 17,18 permits the outboard end collars 18 of one link set to overlap the inboard end collars 17 of an adjoining link set in the track chain. As shown in the drawings, the outboard surface 36 of the outboard end collar 18 is provided on a thin walled pin boss 38. The outer surface 36 is thus offset laterally a substantial distance from the outer edge 23 of the rail surface 20 to provide the second bore 33 with a predetermined bore length "L$_2$" that is at least as great as the overall width "W" of the rail surface 20. Preferably, the outer surface 36 is offset laterally at least 0.75 times the rail width "W" beyond the outer edge 23 of the rail surface 20. For purposes hereinafter described, the boss 38 has at least one flat 39 formed on its outer periphery 40. More advantageously, the boss 38 has two flats 39 oriented opposite each other or disposed 180° apart, as shown in FIG. 2.

Referring more particularly to FIG. 3, the joint 14 includes a cylindrical pin 41, a rotatable tubular bushing 50 and a pair of hardened sleeve bearings 54. The pin 41 has opposite end portions 42, each of which is pressed and non-rotatably mounted into a respective one of the second bores 33 of the outboard end collars 18 of each link 16 in a link set 11.

As best shown in FIGS. 6 and 7, the joint 14 further includes means 45 for mechanically interlocking the pin 41 within the second bores 33 to eliminate end play by preventing any axial movement of the links 16 along a central axis 43 of the pin 41. Mechanically interlocking means 45 comprises a circumferentially disposed, generally arcuately shaped groove 44 formed about each of the end portions 42 of the pin 41 and at least one mechanically formed nodule 47 which protrudes radially inwardly from each of the second bores 33 into a respective one of the grooves 44. The mechanically formed nodules 47 are preferably formed by means of a punch device 48. Preferably, a pair of such punch devices are located perpendicular to the pin axis on each of the flats 39 provided on the pin boss 38. The application of a sufficient force on the punch devices 48 will result in the extrusion of the boss metal into the groove 44.

The tubular bushing 50 is provided with a pin bore 51 which is of a size sufficient to freely rotatably mount the bushing 50 about the pin 41. Bushing 50 has a pair of opposite end faces 53 and is of a size to extend between and to be freely rotatable relative to the inboard end collars 17.

As best shown in FIG. 5, the pair of hardened sleeve bearings 54 each have an outer peripheral surface 56, an inner bearing surface 57, an inner end face 60, and an opposite outer end face 62. The sleeve bearings 54 are adapted to be press fitted into the first bores 29 of the inboard end collars 17. It should be understood by those skilled in the art that such sleeve bearings 54 must have a certain minimum length that is sufficient to support the loads imposed upon the joint 14 during operation, as dictated by the weight and power of the vehicle on which the track chain 10 is placed. As can be seen, the first bores are substantially larger than the second bores 33 in order to receive the sleeve bearings 54. Each outer surface 56 is of a size sufficient to non-rotatably mount the bearings within bores 29. To greatly resist any rotational movement of the sleeve bearing 54 within the first bores 29, the outer surface 56 of each bearing is preferably provided with a knurled central portion 59. After the bearings 54 are press fitted into the first bores 29, the knurls imbed themselves into the softer metal of the link bore 29 and grip the bore and, in effect, mechanically interlock the sleeve bearings 54 to the first bores 29. The inner bearing surface 57 is of a size to freely rotatably mount the pin 41 therewithin. The sleeve bearing 54 is also hardened to provide greater wear life. The bearing surface 57 and the end faces 60,62 are provided with a hardness of at least Rockwell C 55 and, preferably, a hardness of Rockwell C 57-62.

Means 72 for lubricating the joint 14, as well as means 66 for sealing lubricant in and abrasives out of joint 14, are also provided. Lubricating means 72 includes a plugged bore in the pin 41 defining a lubricant reservoir 73 and a radial passage 74. Passage 74 communicates lubricant in the reservoir 73 with the pin bore 51 of the bushing 50 and the inner bearing surfaces 57 of the sleeve bearings 54.

Seal means 66 includes a first pair of seals 67 to provide sealing between the bushing 50 and the inboard end collars 17 and a second pair of seals 69 to provide sealing between the inboard end collars 17 and the outboard end collars 18. Each of the first pair of seals 67 is disposed in a respective one of the first bores 29 of the inboard end collars between the inner end face 60 of the sleeve bearing 54 and the adjacent end face 53 of a bushing 50 and in sealing engagement with such bushing end face 53. One of the second pair of seals 69 is disposed within each of the counterbores 63 between the shoulder 65 of the counterbore and the adjacent outer end face 62 of the sleeve bearings 54 and in sealing engagement against the outer end face 62.

A set of four thrust rings 70 are disposed internally of each of the seals 67,69. The thrust rings 70 are provided to maintain a predetermined minimum axial spacing for the seals 67,69 to prevent the seals from being crushed during assembly or operation.

INDUSTRIAL APPLICABILITY

The endless track chain 10 constructed in accordance with the teachings of the present invention advantageously provides significantly improved bushing wear life and lower maintenance costs. These advantages are provided without a loss of structural integrity or load carrying capacity of the track chain 10 or any disadvantageous increase of the rail gauge dimension "G".

Bushing wear life in the present track is increased by the fact that the bushing 50 is rotatably mounted relative to the links 16. This significantly reduces frictional wear on the bushing, as well as the sprocket of the vehicle, because the scrubbing action which occurs between the sprocket and the fixed or non-rotatable bushing of prior track chains is eliminated. Rotation of the bushing 50 during operation also allows wear to occur uniformly about the entire circumference of the bushing, instead of at just one location of such prior fixed bushing track chains. Furthermore, the necessity of disassembling the track chain to turn the bushings of prior chains is eliminated. Thus, the present rotatable bushing track chain 10 requires less servicing, which lowers maintenance costs.

The use of a rotatable bushing 50 in the present invention is made commercially practical by the use of hardened sleeve bearings 54 that are non-rotatably mounted in the first bores 29 of the inboard end collars 17. Such sleeve bearings 54 are provided with a sufficient hardness to withstand the large driving forces that are exerted on the track chain 10 during operation without fretting or galling of its bearing surface 57.

Lubricating means 72 are provided to lubricate the joint 14 and negate internal frictional wear between the pin 41 and sleeve bearings 54 and the bushing 50 where relative pivotal movement occurs. Sealing means 66 are provided in the joint 14 to seal in lubricant and to seal out abrasives. As previously described, the sealing means 66 includes first and second pairs of seals 67,69. The second pair of seals 69 are conventionally located in counterbores 63 in the outboard end collars 18 of the links 16 to seal between overlapping inboard and outboard end collars 17,18 of adjoining link sets 11. The first pair of seals 67 are an additional set of seals that are incorporated into the present track chain joint 14 to seal in lubricant and seal out abrasive materials between the rotatable bushing 50 and the inboard end collars 17.

The present invention advantageously provides the additional space needed to accommodate both the first and second pairs of seals 67,69 without any increase in the rail gauge width "G" or loss in the structural integrity of the track chain 10. This advantage is achieved by the use of an unique link design in the present invention. Such link design provides the first bore 29 in the inboard end collars of the links with a longer bore length "$L_1$" that is generally equal to the length of one of the sleeve bearings 54, plus the length of one of the trust rings 70 so as to accommodate such sleeve bearing 54 and one of the first pair of seals 69 within the length of first bore 29. Thus, a press fitted connection along the full length of the sleeve bearings 54 is provided in order to maintain the structural integrity of the joint 14 during track operation. Likewise, each of the second bores 33 in the outboard end collars 18 of the links 16 is provided with an increased bore length "$L_2$" sufficient to provide for the press length on the pin end portion 42 required to maintain the structural integrity of the joint 14 during track operation, while providing the length needed to accommodate its counterbore 63 and the pin groove 44. These bore lengths, "$L_1$","$L_2$", are provided in the design of the link 16 by offsetting the bore lengths relative to their respective half-width portions 26,27 of the rail surface 20 on the links 16. The overall width of the joint is increased without disturbing the location of the rail surface 20, thus allowing the rail gauge "G" to be maintained at a desired dimension, or not increased, so as not to effect the other components of the track-type vehicle or prevent the use of the present track chain 10 as a replacement for existing types of track chains.

Mechanical interlocking means 45 are provided to eliminate end play in the point. The interlocking means 45 includes the incorporation of grooves 44 about the end portions 42 of the pin 41. Once the track chain 10 is assembled in a conventional manner with a track press, a suitable punch device 48 is placed on each of the flats 39 provided on the bosses 38 of the outboard end collars 18 and in radial alignment with the groove 44 in the pin end portions 42. The flats 39 help prevent the punch device 48 from slipping, which might otherwise occur if placed against a cylindrical surface. A suitable force is then applied to the punch devices 48 by means of a press or the like to extrude metal from the boss 38 into the pin grooves 44, thus forming a mechanically formed nodule 47 of the boss metal protruding from the second bore 33 into the groove 44, such nodule 47 having a cross-sectional configuration substantially conforming to the arcuate shape of the pin groove 44. In operation, the nodule 47 prevents any axial movement of the pin 41 in the second bore 33 of the outboard end collars 18, thus ensuring that the joint 14 remains tight without any end play that could result in the unloading of the sealing force of the seals 67,69, thereby preventing the loss of lubricant from the joint 14.

Other aspects, objects and advantages of the present invention can be obtained from a study of the drawings, the disclosure and the appended claims.

We claim:

1. Apparatus for retaining the track joints of an endless track chain for track-type vehicles to prevent end play in such joints, each joint including first and second pairs of links and a cylindrical pin, each link of said first pair of links having an inboard end collar with a first bore therethrough, and each link of said second pair of links having an outboard end collar with a pin boss extending a substantial distance outwardly therefrom and a second bore therethrough, and said pin having opposite end portions, each end portion being pressed and non-rotatably mounted into a perspective one of said second bores of said outboard end collars, said apparatus comprising:

a generally arcuately shaped annular groove formed in each of said opposite end portions of said pin, each groove being disposed within said bore at a location along said pin boss; and at least one mechanically formed nodule protruding inwardly from each of said second bores into respective ones of said pin grooves, each nodule having a cross-sectional configuration substantially conforming to its groove and being formed from material that has been permanently extruded from its pin boss into said groove.

2. The apparatus of claim 1 wherein said pin boss has an outer periphery having a pair of flats that are spaced opposite each other on said outer periphery, and said apparatus includes a pair of said nodules, each nodule being extruded at one of said flats.

3. The apparatus of claim 2 wherein said joint includes:

a tubular bushing of a size to extend between and to be freely rotatable relative to said inboard end collars and having a pin bore of a size sufficient to freely rotatably mount said bushing about said pin; and a pair of hardened sleeve bearings, each having an outer peripheral surface and an inner bearing surface, said outer surface being of a size sufficient to non-rotatably mount said bearing within a respective one of said first bores of each inboard end collars and said inner bearing surface being of a size to freely rotatably mount said pin therewithin.

4. The apparatus of claim 3 wherein said joint further includes:

means for lubricating said joint; and
means for sealing said joint.

5. The apparatus of claim 4, wherein said bushing has a pair of opposite end faces and each of said sleeve bearings has an inner end face and an opposite outer end face, and said outboard end collars of each link has a counterbore about said second bore having a shoulder at the bottom thereof, and wherein said sealing means includes:

a first pair of seals, each first seal being disposed between a respective one of said inner end faces of said sleeve bearing and the adjacent end face of said bushing and in sealing engagement with said bushing end face;

a second pair of seals, each second seal being disposed between a respective one of said shoulders of said counterbores and the adjacent outer end face of said sleeve bearings and in sealing engagement against said outer end face; and a set of four thrust rings, one of said thrust rings being disposed internally of a respective one of said seals.

6. A method for retaining a track joint of an endless track chain for track-type vehicles, said track chain including a plurality of link sets, each link set including a pair of laterally spaced, longitudinally extending links, each link including a laterally inwardly offset inboard end collar, an opposite laterally outwardly offset outboard end collar and a longitudinally disposed rail surface, said rail surface having a predetermined overall width, said inboard end collar having a first bore therethrough, said outboard end collar having a second bore therethrough, and a like plurality of said joints for articulately coupling the inboard end collars of one link set to the outboard end collars of an adjoining link set, each joint including a cylindrical pin having opposite end portions, each end portion being pressed and non-rotatably mounted into a respective one of sad second bores of said outboard end collars, said method comprising the steps of:

forming a generally arcuately shaped annular groove in each of said opposite end portions of said pin;

forming a pin boss extending a substantial distance outwardly from each of said outboard end collars and providing said second bore with a predetermined bore length that is at least as great as the overall width of said rail surface;

forming at least one flat on an outer periphery of said boss, said flat being aligned with said groove in said pin after assembly of said pin end portions into said second bore;

placing a suitable punch device in a radial orientation against said flat and in alignment with said groove; and applying a sufficient force on said punch device to extrude said boss into said groove to form at least one mechanically formed nodule having a cross-sectional configuration substantially conforming to said groove protruding from said second bore of each outboard end collar into a respective one of said grooves.

7. A method of assembling a joint of an endless track chain for track-type vehicles to prevent end play in said joint, said joint including a pair of links and a cylindrical pin, each link including a laterally outwardly offset outboard end collar having a boss extending outwardly therefrom and a bore therethrough, each boss having an outer periphery, and said pin including opposite end portions, each end portion being pressed and non-rotatably mounted into a respective one of said bores of said outboard end collars, said method comprising the steps of:

forming a generally arcuately shaped annular groove about each of the end portions of said pin;

placing a punch device against the outer periphery of said boss in radial alignment with said groove in said end portion of said pin;

applying a sufficient force on said punch device to form at least one mechanically formed nodule protruding from said second bore of each outboard end collar into a respective one of said grooves, said nodule having a cross-sectional configuration substantially conforming to said groove.

8. The method of claim 7 further comprising the steps of:

forming at least a pair of flats oriented opposite each other on the outer periphery of said boss; and placing a pair of said punch devices disposed in opposing alignment on said flats to form a pair of said nodules into each of said pin grooves.

* * * * *

UNITED STATES PATENT AND TRADEMARK OFFICE
CERTIFICATE OF CORRECTION

PATENT NO. : 5,201,171

DATED : April 13, 1993

INVENTOR(S) : Peter W. Anderton, Morris E. Taft, Michel P. Peeters, and Jean-François P. C. Villard It is certified that error appears in the above-identified patent and that said Letters Patent is hereby corrected as shown below:

Column 7, line 26, Claim 1, "perspective" should be --respective--.

Signed and Sealed this

First Day of February, 1994

Attest:

BRUCE LEHMAN

Attesting Officer   Commissioner of Patents and Trademarks